United States Patent [19]
Dossier

[11] 3,861,506

[45] Jan. 21, 1975

[54] FRICTION FREE WHEELS PROVIDED WITH DISENGAGEMENT OR LOCKING REVERSAL MEANS

[75] Inventor: Michel Dossier, Orgeval, France

[73] Assignee: Agence Nationale de la Recherche (ANVAR), Paris, France

[22] Filed: Mar. 15, 1973

[21] Appl. No.: 341,738

[30] Foreign Application Priority Data
Dec. 22, 1972 France .............................. 72.46028

[52] U.S. Cl. ..................... 192/43, 81/63.1, 192/45.1
[51] Int. Cl. ............................................. F16d 41/08
[58] Field of Search ...................... 192/43, 45.1, 47; 188/82.2, 82.8; 81/60, 63.1

[56] References Cited
UNITED STATES PATENTS

| | | | |
|---|---|---|---|
| 1,859,600 | 5/1932 | Prettyman .............................. | 192/43 |
| 1,867,938 | 7/1932 | Dalton ................................... | 192/43 |
| 2,760,614 | 8/1956 | Marshall ............................... | 192/43 |
| 3,345,093 | 10/1967 | Kimmel et al. ................. | 192/45.1 X |
| 3,437,185 | 4/1969 | Daugherty ...................... | 192/43.2 X |
| 3,679,031 | 7/1972 | Stephens.............................. | 81/63.1 |

Primary Examiner—Allan D. Herrmann
Attorney, Agent, or Firm—Larson, Taylor & Hinds

[57] ABSTRACT

This is a one-way rotary coupling, with frictional elements such as shoes or the like interposed between a central body, shaft or hub, and a sleeve or ring rotatable around this central body. To ensure reversal of the direction of drive, a cage is rotatable with the frictional elements, in combination with elastic means such that the cage is tiltable angularly with respect to the central body, towards one or other of two end positions, by suitable actuation.

17 Claims, 10 Drawing Figures

FRICTION FREE WHEELS PROVIDED WITH DISENGAGEMENT OR LOCKING REVERSAL MEANS

The invention relates to friction couplings of the free wheel type, provided with means adapted to enable reversal at will of their direction of rotation or of disengaging them.

The use of means of this type shows itself to be necessary in numerous applications, but the solutions offered up to the present do not give satisfaction.

For example, the possibility of reversing at will the direction of drive is indispensable if it is desired to use this type of coupling to produce hand tools of the screwdriver type which are used both for screwing and for unscrewing, or keys which must be capable both of tightening and untightening bolts, nuts, spark-plugs, etc.

The invention applies more particularly to friction couplings comprising between the two coupled bodies, for example between a central body and a sleeve or outer ring, shoes or wedges cooperating with orientable skids.

Recourse is had, according to the invention, to produce the abovesaid means, to a cage capable of being rotated by the assembly of shoes, in combination with elastic means such, that said cage may be tilted angularly with respect to the central body, in one or other of its extreme positions, by suitable actuation.

According to a preferred embodiment, recourse is had to a cage such as mentioned above and to elastic elements articulated along axes parallel to the axis of the coupling, on one hand, on the said cage and, on the other hand, on the central body, said cage being angularly rotatable or tiltable with respect to the central body, in one or other of its extreme positions, or stopped in the middle position of disengagement, by an actuating plate capable itself of different positions predetermined with respect to said central body, and capable if necessary of driving directly the central body in one or other direction.

According to a modification of the invention, said cage comprises flexible elastic elements cooperating with tilting elements articulated, on one hand, on said flexible elements and on the other hand, on the central body.

The invention relates more particularly to certain types of application as well as to certain embodiments of said features; and it contemplates, more particularly again and this by way of new industrial products, mechanisms of the type concerned including the application of these same features and assemblies or engines comprising such mechanisms.

The invention will in any case be well understood by means of the complement of description which follows, as well as of the accompanying drawings, which complement and drawings are of course given primarily by way of indication and do not imply any limiting character.

Figure 9:
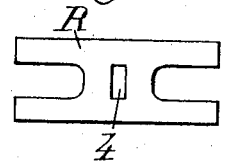
Figure 10:
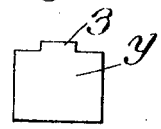

Lastly FIGS. 9 and 10 illustrate separately in plan view, flexible strips comprised by the latter modification.

Figure 1:
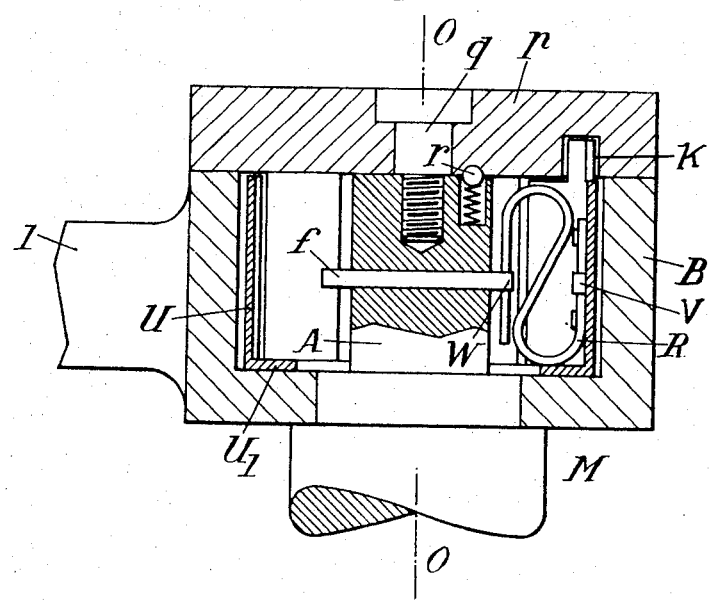
FIGS. 1 and 2 illustrate respectively in axial section, with portions removed, and in plan view, with the actuating plate lifted off, one embodiment of a reversible free wheel with a cage constructed according to the invention.
Figure 2:
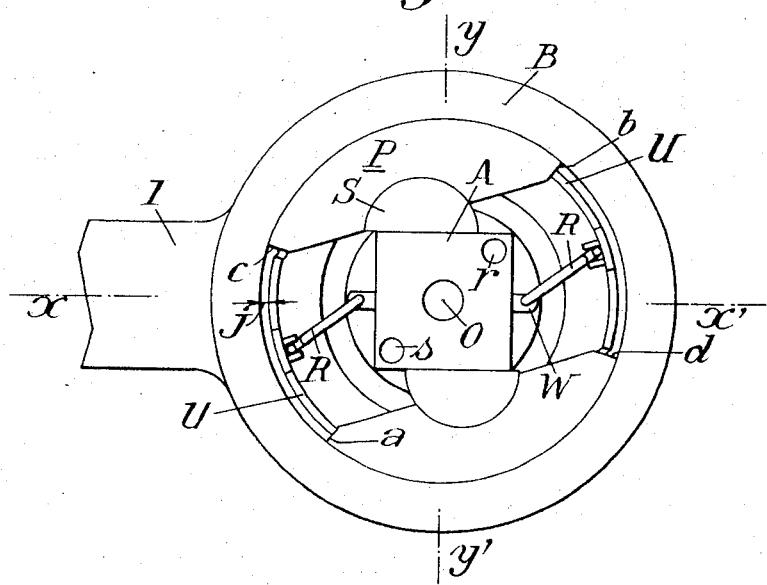

There is shown in FIGS. 1 and 2, one of the embodiments capable of being adopted, for the application of the features specified above.

A free wheel according to these FIGS. 1 and 2 is produced between, on one hand, a central body constituted for example by the end A of a shaft M, for example of rectangular cross-section, and on the other hand, a ring or a sleeve B centered with respect to this shaft, capable of rotating around the axis O of the latter, said free wheel comprising two systems of intermediate parts inserted between the shaft and the ring and each constituted by a shoe such as P and an auto-orientable skid in the shape of a cylinder or truncated sphere such as S.

In the embodiment shown, the skids S can slide by their base on flat surfaces of the central body A, two shoes being provided, but this being by way of example.

Said intermediate parts (for example shoes and skids) are held in one or other of symmetrical configurations with respect to the axial plane $y' y$, by a rotatable cage U (FIG. 3) coupled to the body A by springs R articulated at V on the cage U and at W on the body A along axes parallel to the axis O.

Figure 3:
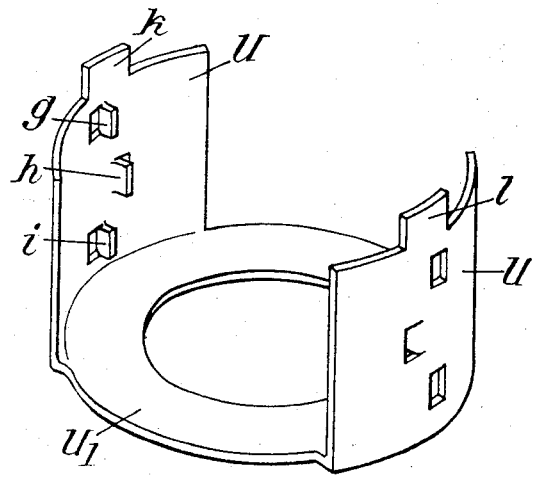
FIG. 3 shows separately, in perspective, the cage driving the shoes of the free wheel of the embodiment of FIGS. 1 and 2.

This rotatable cage U, seen in detail in FIG. 3, is constituted for example by two cylindrical cheeks fast to an annular base $U_1$ capable if necessary of ensuring centering with respect to the axis O (although in reality, and as will be evident below, the springs R ensure this centering), said cage being in any case arranged so as to be rotatable with respect to the sleeve B, by leaving a play $j$ between its outer surface and the inner wall of the sleeve.

Said cage U can hence rotate around the axis O under the effect of the springs R but, being in abutment on the ends of the shoes P at $a$, $b$ (FIG. 2) it transmits to them the rotary torque exerted by the two springs R, which hold in contact the assembly of constituent parts of the free wheel.

In the configuration shown in FIG. 2, the cage is not in contact with the two other ends $c$, $d$, of shoes P, with which ends it comes on the contrary into contact after tilting into the symmetrical position with respect to the axis $x' x$, play then appearing at $a$ and $b$.

As regards the springs R, they are advantageously given an S shape, as is seen in FIG. 1. Each spring R is compressed between its two articulations V and W on the cage and the body A respectively. The articulation W is constructed, in the embodiment shown, at the end of a bar $f$ passing through the body A and pierced by a cylindrical hole in which one of the sides of the spring R parallel to the axis O can pivot.

At the other end, the side V of the spring R is supported on the cage A and it is held tangentially by lugs such as g, h, i (FIG. 3) cut out in the cage and turned back so as to form the bearing of this articulation.

With this assembly, actuating means are combined to enable at will the passage of the cage U from one to the other of its operational positions, for which it becomes urged against shoes P, either at a b or at c d, said means being constituted for example by fingers k, l (FIG. 3) borne by the cage U and adapted to penetrate into openings m, n provided in an actuating plate p (although any other actuation can be provided).

Figure 4:
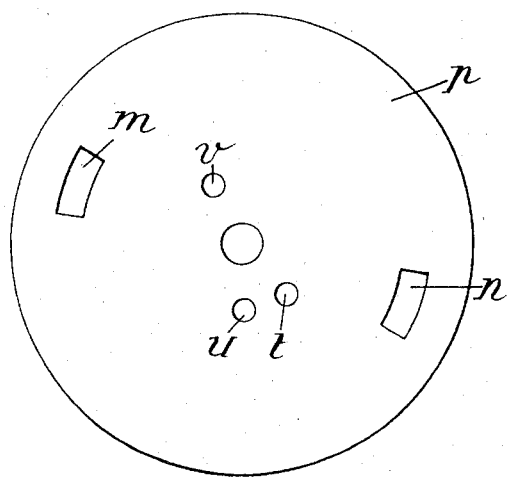
FIG. 4 shows diagrammatically, in plan view, the actuating plate of said free wheel.

This plate, shown in FIGS. 1 and 4, is for example mounted on the end of the central body A, being capable of rotating around a pivot q.

Advantageously, stop means are provided to enable positioning of the actuating plate in its operational positions, which can be three in number, namely:

two end positions corresponding to coupling respectively in the two opposite drive directions, and an intermediate disengaged position.

The stop means consist for example of spring balls such as r, s capable of cooperating, the ball r with one or other of the two cavities t, u, the ball s with a cavity v (FIG. 4).

When the ball r is engaged in the cavity t, the configuration of the free wheel is that shown in FIG. 1. When this ball is engaged in the cavity u, the symmetrical configuration is obtained. When the ball s is engaged in the cavity v, a middle configuration is obtained, the springs R being held substantially in the plane x x' (FIG. 1) at their maximum compression, and the shoes are free; this is the disengaged position.

Advantageously, the windows m, n, cooperating with the fingers k, l, have an angular extension greater than the latter, which is effected in both symmetrical engagement directions, the cage is subjected to the action alone of the springs R and abuts on the shoes P, without being limited by the openings of the actuating plate.

There can also be provided stops such, that the angular deflection of the actuating plate p with respect to the body A is limited positively to its two end positions corresponding respectively to engagement of the ball r in the cavities t or u. There is thus produced a possibility of direct drive of the body A by the plate p without the intervention of the ring B and shoes P. In other words, this arrangement enables the body A to be driven, either by the ring B, or by the actuating plate p.

The latter arrangement is advantageous, for example in the application to hand keys (FIGS. 1 and 2), for screwing and unscrewing. It is important in fact to be able, at the beginning of the operation, to act directly on the body A by means of the actuating feature p, without using the handle 1. Once the tool is in engagement with the screw, operation is then on the other hand by means of the handle 1, which is manipulated in alternate movement, in combination with the free wheel.

Figure 5:
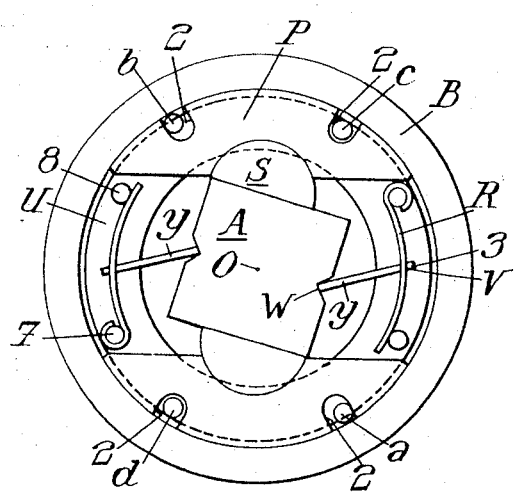
FIG. 5 illustrates diagrammatically, in plan view similar to FIG. 2, with the actuating plate lifted off, a modification of the embodiment of the reversible wheel according to the invention.
Figure 6:
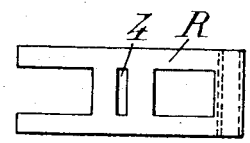
FIGS. 6 and 7 illustrate separately in plan view flexible strips comprised by this modification.
Figure 7:
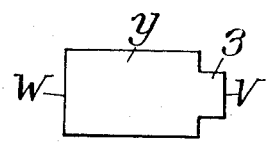

FIGS. 5 and 7 show diagrammatically a modification of the production of the drive cage in which the shoes, instead of being thrust by their ends, are drawn by the fingers fast to the cage (constituted here by a simple ring U), such as a, b or c, d, this feature being particularly advantageous in the case of considerable values of the coefficient of friction between the shoes P against the ring B, such as can be obtained by suitable surface treatments or multiconic sliding surfaces, for example.

Fingers a, b, c, d then cooperate with the corresponding recesses 2 formed in the shoes, which recesses are of greater size than those of the fingers, to ensure good operation of the assembly. It is seen, in the position shown in FIG. 5, that the fingers a, b are in contact with the edges of the corresponding recesses 2, whilst the fingers c and d are spaced therefrom. It is the reverse which occurs after reversal.

In this FIG. 5 also, is shown a modification of the tilting mechanism where the springs R are flexible strips attached to a ring U and coupled to the central body by tilting elements y hinged at their ends V and W at the center of the flexible strip on one hand, and on the body A on the other hand. At V, a tongue 3, cut out in the element y, penetrates into a slot 4 of the spring R. At W, the element y penetrates into a notch 5 of the body A, or in any other way.

Figure 8:
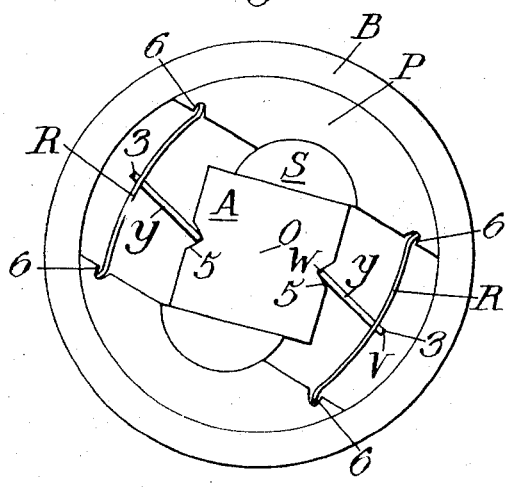
FIG. 8 illustrates, in a similar manner to FIG. 6, another modification.

FIG. 8 shows another modification of the tilting mechanism in which the cage of the preceding embodiments is combined with flexible strips R, directly encased at their ends, with play, in grooves 6 formed in the shoes P. In this embodiment, the actuating plate can drive the shoes P directly.

The reverse solution could be adopted, the part y playing the role of the spring R, whilst the part shown at R in FIG. 8 would be rigid.

As a result of which, whatever the embodiment adopted, there can be produced one-way drive couplings, reversible, whose operation emerges sufficiently from the foregoing for it to be unnecessary to dwell further on the subject, and which have with respect to one-way couplings already existing, numerous advantages, for example:

that of enabling the drive of the central body, either directly by the actuating plate, or through the ring and the free wheel mechanism, and that lastly of enabling complete disengagement of the coupling in both directions.

As is self-evident, and as emerges already from the foregoing, the invention is in no way limited to those of its types of application and embodiments, which have been more especially envisaged; it encompasses, on the contrary, all modifications, especially those for which it would be applied to friction free wheels of another type than that indicated by way of example in the present application.

I claim:

1. A reversible one-way rotary coupling, comprising a central shaft, a surrounding sleeve member relatively rotatable about the shaft, drive means interposed between said shaft and sleeve and selectively movable between two drive positions to selectively fix the sleeve and shaft to each other in one or the other direction of rotation, said drive means comprising shoes slidable over the surface of the sleeve member, and skids interposed between each shoe and the shaft and slidable over a flat surface carried by one of said shoe and shaft to permit movement of said drive means between their two drive positions, a reversing device mounted concentrically to said shaft and rotatable thereabout and with said drive means to selectively drive the shoes and skids in one direction or the other about said shaft between said two drive positions, and over-center spring means interposed between said shaft and reversing device for ensuring movement of said reversing device from one drive position in one direction to the selected other drive position in the other direction, and for constantly exerting an elastic force on the shoes and skids in either selected drive position.

2. A coupling as claimed in claim 1, wherein the reversing device is U-shaped and has two concentric segments interposed in the space between the shoes, to thrust the shoes in one direction or the other, and wherein said spring means comprises springs interposed between said segments and the drive shaft so as to be resiliently stressed when the reversing device passes from one to the other of its two positions.

3. A coupling as claimed in claim 2 wherein each spring is in the form of an S-shaped spring whose bases are respectively articulated on the shaft and on the shoe.

4. A coupling as claimed in claim 1 wherein the reversing device is constituted by a ring which may be urged in one direction or the other to effect the change of drive movement by means of projection borne by the said ring passing with play through recesses in the shoes, said spring means being interposed between said ring and the shaft and being resiliently stressed when the ring passes from one to the other of its two operative positions.

5. A coupling as claimed in claim 1 wherein the reversing device is constituted by separating elements interposed between the respective shoes for effecting movement in one direction or the other of the shoes for the reversing action, and said spring means are interposed between said separating elements and the shaft and resiliently stressed when the reversing device passes from one to the other of the two drive positions.

6. A coupling as claimed in claim 1 wherein said reversing device comprises a cage rotatable with the shoes and skids.

7. Coupling according to claim 6, wherein the rotation of the cage between said two drive positions is obtained from an actuating plate mounted so as to be displaceable angularly around the axis of the coupling, in combination with positioning means.

8. Coupling according to claim 7, wherein the actuating plate is capable, in addition, of bringing the cage into a disengaged drive position.

9. Coupling according to claim 7, wherein the cage is driven by the actuating plate by means of projections provided on the cage and traversing the plate, with play, in corresponding openings.

10. Coupling according to claim 6, wherein the springs have an S shape, their outer arms being hinged respectively on the central shaft and on the cage.

11. Coupling according to claim 6, wherein the cage thrusts in abutment, under the effect of said springs, onto the shoes.

12. Coupling according to claim 6, wherein the cage acts in traction on the shoes.

13. Coupling according to claim 11, including two opposite shoes, wherein the cage is constituted by two cylindrical cheeks fast to a central ring, said cheeks occupying with play the cylindrical spaces separating the two shoes.

14. Coupling according to claim 12, wherein the cage comprises two sets of pins adapted to pass through corresponding openings formed in the shoes, with play such that the drive can be effected either in one sense by one of said sets of pins, or in the other sense by the other of said two sets of pins.

15. Coupling according to claim 12, wherein the spring means are constituted by elastic strips fixed on the cage, and supported and hinged at their center on tilting elements hinged on the central body.

16. Coupling according to claim 6, wherein the cage is constituted from flexible elements encased with play in the shoes and connected to the central shaft by tilting elements hinged at their ends, on one hand, at the center of said flexible elements and, on the other hand, to the central shaft.

17. Coupling according to claim 6, with an actuating plate ensuring reversal, wherein stops limiting the movements of said plate with respect to the central body are provided to enable said central body to be directly drive in rotation by the actuating plate, without intervention of the outer sleeve or of the shoes.

* * * * *